United States Patent
Kim et al.

(10) Patent No.: US 9,312,934 B2
(45) Date of Patent: Apr. 12, 2016

(54) METHOD FOR TRANSMITTING EFFICIENT FEEDBACK IN MULTI-ANTENNA WIRELESS COMMUNICATION SYSTEM AND APPARATUS THEREFOR

(71) Applicant: LG Electronics Inc., Seoul (KR)

(72) Inventors: Youngtae Kim, Anyang-si (KR); Kijun Kim, Anyang-si (KR); Hyukjin Chae, Anyang-si (KR); Bonghoe Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/423,648

(22) PCT Filed: Sep. 16, 2013

(86) PCT No.: PCT/KR2013/008341
§ 371 (c)(1),
(2) Date: Feb. 24, 2015

(87) PCT Pub. No.: WO2014/046429
PCT Pub. Date: Mar. 27, 2014

(65) Prior Publication Data
US 2015/0229371 A1   Aug. 13, 2015

Related U.S. Application Data

(60) Provisional application No. 61/702,246, filed on Sep. 18, 2012.

(51) Int. Cl.
*H04B 7/04* (2006.01)
*H04L 5/00* (2006.01)

(52) U.S. Cl.
CPC ............... *H04B 7/0417* (2013.01); *H04B 7/04* (2013.01); *H04B 7/046* (2013.01); *H04B 7/0469* (2013.01); *H04B 7/0478* (2013.01); *H04L 5/0014* (2013.01)

(58) Field of Classification Search
USPC ................... 375/267, 260; 370/252, 329, 315
See application file for complete search history.

(56) References Cited

U.S. PATENT DOCUMENTS 8,085,862 B2 * 12/2011 Wang ........................... 375/260
2011/0205930 A1 * 8/2011 Rahman et al. ............... 370/252

(Continued)

FOREIGN PATENT DOCUMENTS

KR   10-2010-0116555 A   11/2010
KR   10-2011-0011500 A   2/2011

(Continued)

*Primary Examiner* — Eva Puente
(74) *Attorney, Agent, or Firm* — Dentons US LLP

(57) ABSTRACT

The present invention relates to a method for transmitting a signal of a transmitting side in a wireless communication system that supports multiple antennas. More particularly, the method comprises the steps of: receiving, from a receiving side, feedback information for transmitting the signal of the transmitting side; and transmitting a signal to which a precoding matrix (W) is applied on the basis of the feedback information, wherein the precoding matrix (W) is expressed as a multiplication of two precoding matrices ($W_1$ and $W_2$), $W_1$ is set to correspond to a plurality of antenna groups configured according to the feedback information, and $W_2$ is configured such that the signal corresponding to the plurality of antenna groups can be transmitted in a mutual orthogonal way.

11 Claims, 5 Drawing Sheets

(56) References Cited

U.S. PATENT DOCUMENTS

| | | | |
|---|---|---|---|
| 2011/0305191 A1* | 12/2011 | Yu et al. | 370/315 |
| 2012/0134434 A1 | 5/2012 | Chen et al. | |
| 2013/0343299 A1* | 12/2013 | Sayana et al. | 370/329 |
| 2014/0126487 A1* | 5/2014 | Chen et al. | 370/329 |
| 2014/0321356 A1* | 10/2014 | Park et al. | 370/315 |
| 2015/0003360 A1* | 1/2015 | Liu et al. | 370/329 |

FOREIGN PATENT DOCUMENTS

| | | |
|---|---|---|
| KR | 10-2012-0079926 A | 7/2012 |
| WO | 2011-113344 A1 | 9/2011 |

* cited by examiner (a)

(b)

METHOD FOR TRANSMITTING EFFICIENT FEEDBACK IN MULTI-ANTENNA WIRELESS COMMUNICATION SYSTEM AND APPARATUS THEREFOR

This Application is a 35 U.S.C. §371 National Stage entry of International Application No. PCT/KR2013/008341, filed Sep. 16, 2013, which claims benefit of Provisional Application No. 61/702,246 filed Sep. 18, 2012, both of which are incorporated by reference in their entirety herein.

TECHNICAL FIELD

The present invention relates to a wireless communication system and, more specifically, to a method for efficiently transmitting feedback in a multi-antenna wireless communication system and an apparatus therefor.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting side or a receiving side of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP LTE (3rd Generation Partnership Project Long Term Evolution) supports a maximum of 4 Tx antennas for downlink transmission and defines a precoding codebook for downlink transmission using the Tx antennas.

In a MIMO based cellular communication environment, data transfer rate can be improved through beamforming between a transmitting side and a receiving side. Whether beamforming is applied is determined based on channel information, a channel estimated through a reference signal at the receiving side is appropriately quantized using a codebook and fed back to the transmitting side.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \ldots & h_{1,Nt}(i,k) \\ h_{2,1}(i,k) & h_{2,2}(i,k) & \ldots & h_{2,Nt}(i,k) \\ \vdots & \vdots & \ddots & \vdots \\ h_{Nr,1}(i,k) & h_{Nr,2}(i,k) & \ldots & h_{Nr,Nt}(i,k) \end{bmatrix}$$

Here, H(i,k) represents a spatial channel matrix, Nr denotes the number of Rx antennas, Nt denotes the number of Tx antennas, r is an Rx antenna index, t is a Tx antenna index, i represents an OFDM (or SC-FDMA) symbol index and k represents a subcarrier index.

$h_{r,t}(i,k)$ is an element of the channel matrix H(i,k) and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R. $R=E[H_{i,k}{}^H H_{i,k}]$ where H denotes a spatial channel matrix and R denotes a spatial channel covariance matrix. In addition, E[ ] represents the mean, i represents a symbol index and k represents a frequency index.

Singular value decomposition (SVD) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an Eigen value as a basis using spectrum theory. When it is assumed that the channel matrix H is an m×n matrix composed of a plurality of set elements, the matrix H can be represented as a product of three matrices as follows.

$$H_{m \times n} = U_{m \times n} \Sigma_{m \times n} V_{n \times n}{}^H$$

Here, U and V represent unitary matrices and Σ denotes an m×n matrix including a non-zero singular value. The singular value is $\Sigma = \text{diag}(\sigma_1 \ldots \sigma_r)$, $\sigma_i = \sqrt{\lambda_i}$. Representation as a product of three matrices is referred to as SVD. SVD can handle normal matrices, compared to Eigen value decomposition which can decompose only orthogonal square matrices. SVD and Eigen value composition are related to each other.

When the matrix H is a positive definite Hermitian matrix, all Eigen values of H are non-negative real numbers. Here, singular values and singular vectors of H are equal to Eigen values and Eigen vectors of H. Eigen value decomposition (EVD) can be represented as follows (here, Eigen values may be $\lambda_1, \ldots, \lambda_r$).

$$HH^H = (U\Sigma V^H)(U\Sigma V^H)^H = U\Sigma\Sigma^T U^H$$

$$H^H H = (U\Sigma V^H)^H (U\Sigma V^H) = V\Sigma^T \Sigma V$$

Here, Eigen values can be λ1, ..., λr. Information on U between U and V, which indicate channel directions, can be known through singular value decomposition of HH" and information on V can be known through singular value decomposition of $H^H H$. In general, a transmitting side and a receiving side respectively perform beamforming in order to achieve higher throughput in multi-user MIMO (MU-MIMO). When a receiving side beam and a transmitting side beam are represented by matrices T and W, a channel to which beamforming is applied is indicated by THW=TU(Σ)VW. Accordingly, it is desirable to generate the receiving side beam on the basis of U and to generate the transmitting side beam on the basis of V in order to accomplish higher throughput.

In design of a codebook, it is necessary to reduce feedback overhead using as few bits as possible and to correctly quantize a channel to obtain a sufficient beamforming gain. One of codebook design schemes presented or adopted as a standard by recent mobile communication systems, such as 3GPP LTE (3rd Generation Partnership Project Long Term Evolution), LTE-Advanced and IEEE 16m, is to transform a codebook using a long-term covariance matrix of a channel, as represented by Equation 1.

$$W' = \text{norm}(RW) \quad \text{[Equation 1]}$$

Here, W denotes an existing codebook generated to reflect short-term channel information, R denotes a long-term covariance matrix of channel matrix H, norm(A) represents a matrix in which norm is normalized into 1 per column of matrix A, and W' represents a final codebook generated by transforming the codebook W using the channel matrix H, the long-term covariance matrix R of the channel matrix H and a norm function.

The long-term covariance matrix R of the channel matrix H can be represented as Equation 2.

$$R = E[H^H H] = V\Lambda V^H = \sum_{i=1}^{Nt} \sigma_i v_i v_i^H \quad \text{[Equation 2]}$$

Here, the long-term covariance matrix R of the channel matrix H is decomposed into $V\Lambda V^H$ according to singular value decomposition. V is an Nt×Nt unitary matrix having $V_i$ as an i-th column vector, $\Lambda$ is a diagonal matrix having $\sigma_i$ as an i-th diagonal component and $V^H$ is a Hermitian matrix of V. In addition, $\sigma_i$ and $V_i$ respectively denote an i-th singular value and an i-th singular column vector corresponding thereto ($\sigma_1 \geq \sigma_2 \geq \ldots \geq \sigma_{nt}$).

DISCLOSURE

Technical Problem

An object of the present invention devised to solve the problem lies in a method for efficiently transmitting feedback in a wireless communication system and an apparatus therefor.

The technical problems solved by the present invention are not limited to the above technical problems and those skilled in the art may understand other technical problems from the following description.

Technical Solution

In an aspect of the present invention, a method for transmitting a signal by a transmitting side in a wireless communication system supporting multiple antennas includes: receiving, from a receiving side, feedback information for transmitting the signal of the transmitting side; and transmitting a signal to which a precoding matrix W has been applied on the basis of the feedback information, wherein the precoding matrix W is expressed as a product of two precoding matrices $W_1$ and $W_2$, $W_1$ is set to correspond to a plurality of antenna groups configured according to the feedback information, and $W_2$ is configured such that signals corresponding to the plurality of antenna groups are transmitted in a mutually orthogonal manner.

$W_1$ may be set to maximize the sum of channel gains corresponding to the plurality of antenna groups.

The plurality of antenna groups may include the same number of antennas and have different antenna indices. Further, the sum of the numbers of antennas included in the plurality of antenna groups may be less than the number of antennas of the transmitting side.

The plurality of antenna groups respectively may include different numbers of antennas and have different antenna indices. Further, the plurality of antenna groups may be composed on the basis of channel correlation thereof.

The precoding matrix W may be represented as a product of three precoding matrices $W_1$, $W_2$ and $W_3$, and $W_3$ may be configured as a diagonal matrix indicating phase coefficients. Further, $W_3$ may be configured to be quantized within a predetermined range.

$W_2$ may be configured such that Alamouti scheme is applied or configured such that a quasi-orthogonal scheme is applied.

The method may further include signaling information on the plurality of antenna groups to the receiving side using higher layer signaling.

The feedback information may be information on a channel state measured on the basis of a reference signal transmitted from the transmitting side to the receiving side.

The feedback information may be set on the basis of at least one of a resource element (RE), a resource block (RB) and a system bandwidth.

In another aspect of the present invention, a method for receiving a signal by a receiving side in a wireless communication system supporting multiple antennas, includes: transmitting, to a transmitting side, feedback information for transmitting a signal of the transmitting side; and receiving a signal to which a precoding matrix W has been applied on the basis of the feedback information, wherein the precoding matrix W is expressed as a product of two precoding matrices $W_1$ and $W_2$, $W_1$ is set to correspond to a plurality of antenna groups configured according to the feedback information, and $W_2$ is configured such that signals corresponding to the plurality of antenna groups are transmitted in a mutually orthogonal manner.

Advantageous Effects

According to embodiments of the present invention, it is possible to provide an efficient feedback transmission method in a wireless communication system and an apparatus therefor.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE mobile communication systems are used. However, the description is applicable to any other mobile communication system except for specific features inherent to the 3GPP LTE systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term "base station (BS)" is assumed to refer to any node of a network end, such as a Node B, eNode B, an access point (AP), etc., communicating with a UE. While the following description is based on 3GPP LTE and LTE-A, the present invention is applicable to other communication systems.

In a mobile communication system, a UE may receive information from a BS on downlink and transmit information to the BS on uplink. The information that the UE transmits or receives includes data and various types of control information. There are many physical channels according to the types and usages of information that the UE transmits or receives.

A description will be given of 3GPP LTE (3rd Generation Partnership Project Long Term Evolution) (referred to as LTE hereinafter) and LTE-Advanced (referred to as LTE-A hereinafter) systems as exemplary mobile communication systems to which the present invention is applicable.

Figure 1:
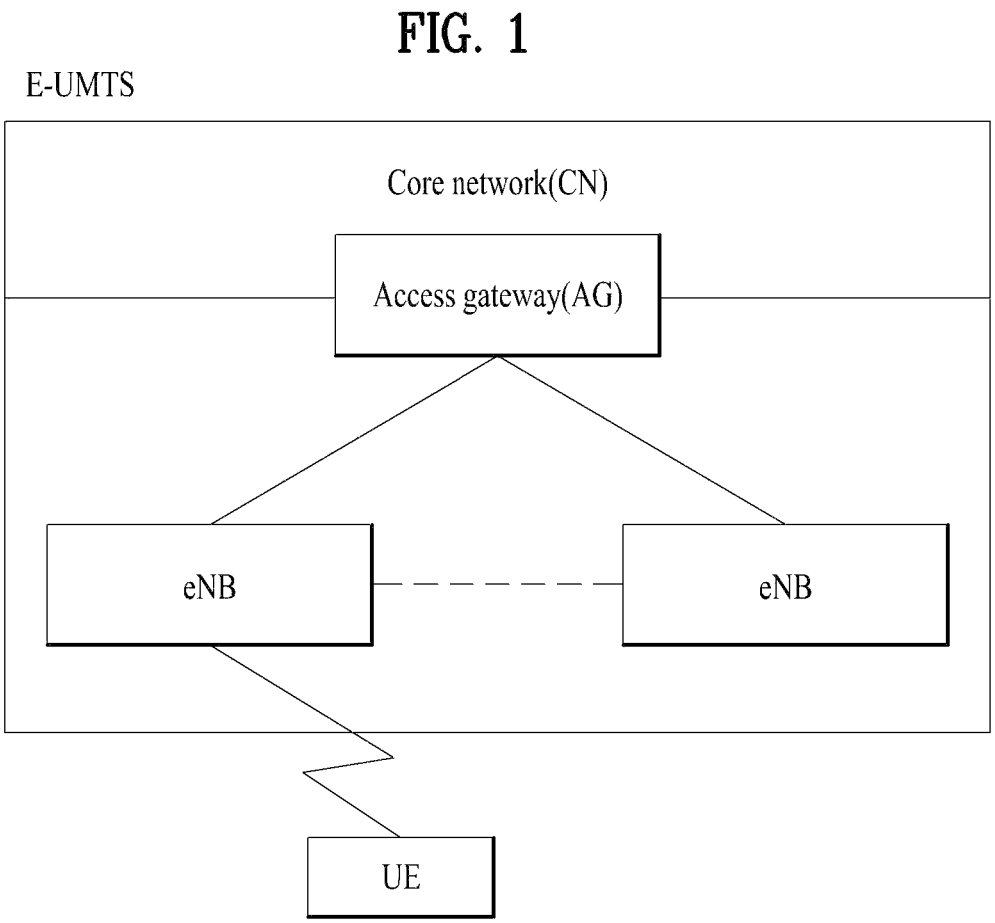
FIG. 1 illustrates an E-UMTS network structure as an exemplary mobile communication system.

FIG. 1 illustrates E-UMTS (Evolved Universal Mobile Telecommunicaiton System) network architecture as an exemplary mobile communication system.

E-UMTS, which evolves from UMTS (Universal Mobile Telecommunication System), is under standardization according to 3GPP. E-UMTS may be regarded as an LTE system. Technical specification of UMTS and E-UMTS refers to Release 7 and Release 8 of "3rd Generation Partnership Project: Technical Specification Group Radio Access Network".

Referring to FIG. 1, E-UMTS includes a user equipment (UE), en eNB and an access gateway (AG) located at the end of a network (E-UTRAN) and connected to an external network. The eNB can simultaneously transmit multiple data streams for broadcast service, multicast service and/or unicast service.

One or more cells are present in one eNB. A cell is set to one of bandwidths of 1.25, 2.5, 5, 10, 15 and 20 MHz and provides downlink or uplink transmission service to multiple UEs. Different cells may be configured to provide different bandwidths. The eNB controls data transmission/reception with respect to a plurality of UEs. The eNB transmits downlink scheduling information about downlink data to a corresponding UE to inform the UE of a time/frequency region used to transmit the data, coding information, data size, hybrid automatic repeat and request (HARQ) related information, etc.

In addition, the eNB transmits uplink scheduling information about uplink data to a corresponding UE to notify the UE of a time/frequency region that can be used by the UE, coding information, data size, HARQ related information, etc. An interface for user traffic or control traffic transmission may be used between eNBs. A core network (CN) may be composed of the AG and a network node for user registration of the UE. The AG manages UE mobility per TA (tracking area) including a plurality of cells.

While wireless communication technology has been developed to LTE on the basis of wideband code division multiple access (WCDMA), demands and expectations of users and carriers steadily increase. Furthermore, technical evolution in wireless communication technology is required to have competitiveness since other wireless access techniques are being developed. That is, decrease in cost per bit, service availability increase, use of flexible frequency band, simple architecture and open interface, adequate power consumption of UEs, etc. are needed.

Recently, 3GPP has standardized technology subsequent to LTE. This is referred to as "LTE-A" in the specification. A main difference between LTE and LTE-A is a system bandwidth different and introduction of a relay. LTE-A aims to support a wideband of up to 100 MHz. To achieve this, LTE-A employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in LTE. Each frequency block is transmitted using a component carrier.

Figure 2:
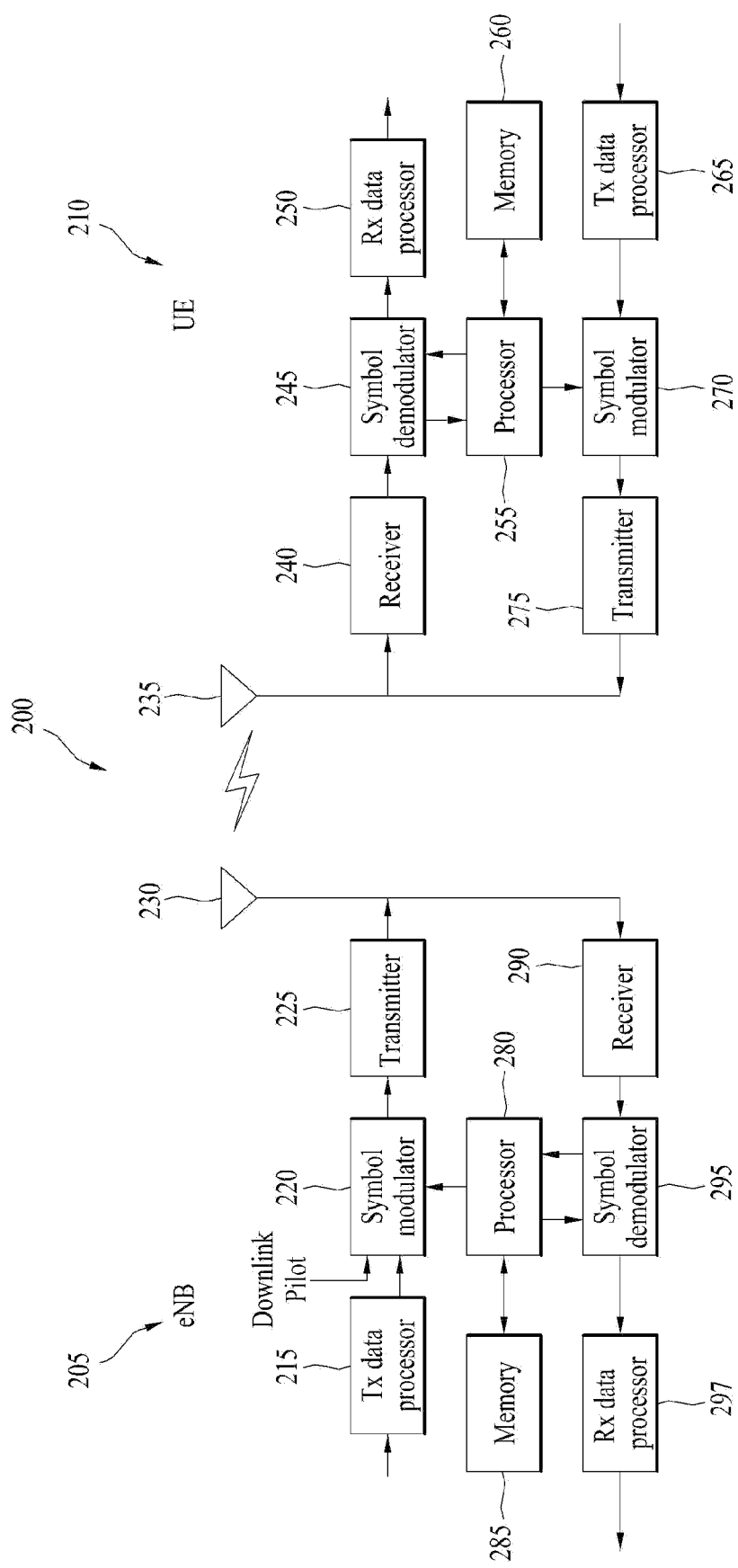
FIG. 2 is a block diagram of an eNB 105 and user equipment (UE) 110 in a wireless communication system 100 according to the present invention.

FIG. 2 is a block diagram illustrating configurations of an eNB 205 and a UE 210 in a wireless communication system 200.

While one eNB 205 and one UE 210 are shown in FIG. 2 to simplify the configuration of the wireless communication system 200, the wireless communication system 200 may obviously include one or more eNBs and/or one or more UEs.

Referring to FIG. 2, the eNB 205 may include a transmission (Tx) data processor 215, a symbol modulator 220, a transmitter 225, a Tx/Rx antenna 230, a processor 280, a memory 285, a receiver 290, a symbol demodulator 295, and an Rx data processor 297. The UE 210 may include a Tx data processor 265, a symbol modulator 270, a transmitter 275, a Tx/Rx antenna 235, a processor 255, a memory 260, a receiver 240, a symbol demodulator 245, and an Rx data processor 250. While the antennas 230 and 235 are each shown as a single antenna in the eNB 205 and the UE 210, the eNB 205 and the UE 210 include multiple antennas. Hence, the eNB 205 and the UE 210 support MIMO (Multiple Input Multiple Output). Furthermore, the eNB 205 may support both single user-MIMO (SU-MIMO) and multi-user-MIMO (MU-MIMO) in the present invention.

On the downlink, the Tx data processor 215 receives traffic data, processes the received traffic data through formatting, coding, interleaving, and modulation (or symbol mapping), and thus outputs modulated symbols ("data symbols"). The symbol modulator 220 processes the data symbols received from the Tx data processor 215 and pilot symbols, thus producing a symbol stream.

More specifically, the symbol modulator 220 multiplexes the data symbols and the pilot symbols and transmits the multiplexed symbols to the transmitter 225. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 225 converts the symbol stream into one or more analog signals and generates a downlink signal suitable for transmission on a radio channel by additionally processing the analog signals (e.g. amplification, filtering, and frequency upconversion). The downlink signal is transmitted to the UE 210 through the antenna 230.

The UE 210 receives the downlink signal from the eNB 205 through the antenna 235 and provides the received downlink signal to the receiver 240. The receiver 240 processes the downlink signal, for example, through filtering, amplification and frequency downconversion and converts the processed downlink signal into digital samples. The symbol demodulator 245 demodulates received pilot symbols and outputs the demodulated pilot symbols to the processor 255 for use in channel estimation.

The symbol demodulator 245 receives a frequency response estimate with respect to downlink from the processor 255, acquires data symbol estimates (i.e. estimates of the transmitted data symbols) by demodulating the received data symbols using the frequency response estimate and provides the data symbol estimates to the Rx data processor 250. The Rx data processor 250 demodulates the data symbol estimates (i.e. performs symbol demapping), deinterleaves the demodulated data symbols, and decodes the deinterleaved data symbols, thereby recovering the traffic data transmitted by the eNB 205.

The operations of the symbol demodulator 245 and the Rx data processor 250 are complementary to the operations of the symbol modulator 220 and the Tx data processor 215 of the eNB 205.

On the uplink, in the UE 210, the Tx data processor 265 outputs data symbols by processing received traffic data. The symbol modulator 270 multiplexes the data symbols received from the Tx data processor 265 with pilot symbols, modulates the multiplexed symbols, and outputs a stream of the symbols to the transmitter 275. The transmitter 275 generates an uplink signal by processing the symbol stream and transmits the uplink signal to the eNB 205 through the antenna 235.

The eNB 205 receives the uplink signal from the UE 210 through the antenna 230. In eNB BS 205, the receiver 290 acquires digital samples by processing the uplink signal. The symbol demodulator 295 provides uplink pilot symbol estimates and uplink data symbol estimates by processing the digital samples. The Rx data processor 297 processes the data symbol estimates, thereby recovering the traffic data transmitted by the UE 210.

The processors 255 and 280 control, adjust and manage operations of the UE 210 and the eNB 205. The processors 255 and 280 may be connected respectively to the memories 260 and 285 that store program code and data. The memories 260 and 285 store an operating system, applications, and general files, in connection with the processors 255 and 280.

The processors 255 and 280 may also be called controllers, microcontrollers, microprocessors, or microcomputers. The processors 255 and 280 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 255 and 280. When the embodiments of the present invention are implemented using firmware or software, the firmware or software may be configured to include a module, a procedure, a function, etc. which performs functions or operations according to the present invention. The firmware or software may be included in the processors 255 and 280, or stored in the memories 260 and 285 and invoked from the memories 260 and 285 by the processors 255 and 280.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/eNB and the network exchange RRC messages through the RRC layer.

The term eNB used in the present invention can refer to a "cell or sector" when used as a regional concept. A serving eNB (or serving cell) can be regarded as an eNB which provides main services to UEs and can transmit and receive control information at a coordinated multiple transmission point. In this sense, the serving eNB (or serving cell) can be referred to as an anchor eNB (or anchor cell). Similarly, a neighbor eNB can be referred to as a neighbor cell.

MIMO System

The MIMO antenna technology is based on the technology that receives a whole message by incorporating data fragments received from a plurality of antennas into one without depending on a signal antenna path. According to the MIMO antenna technology, a data transmission rate may be improved within a specific range, or system coverage may be enhanced with respect to a specific data transmission rate. Under the circumstances, the MIMO technology may widely be used for a user equipment for mobile communication and a relay node, and has received attention as the next generation technology that may overcome limitation of a transmission rate in mobile communication, which causes a limitation situation due to data communication expansion, etc.

Figure 3:
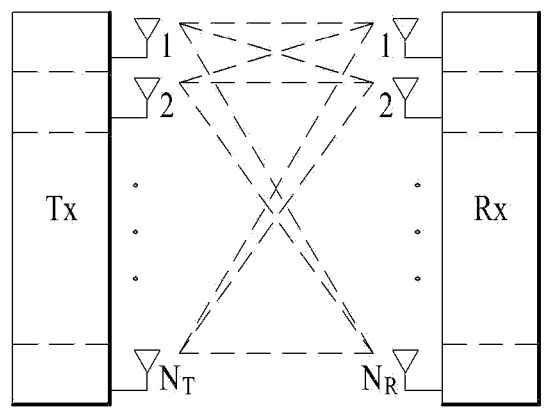
FIGS. 3(a) and (b) illustrate configurations of a general MIMO communication system.
Figure 3:
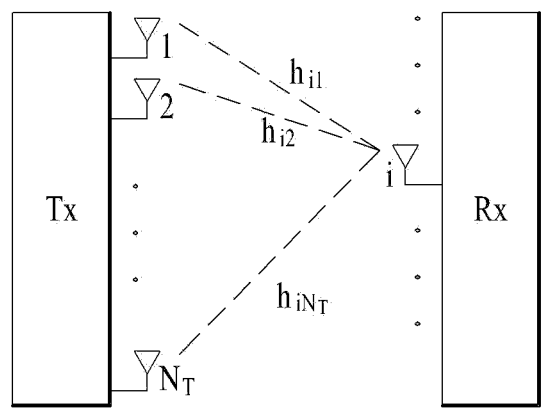

FIG. 3(a) is a schematic diagram illustrating a general MIMO communication system. As shown in FIG. 3(a), if the number of transmitting antennas is increased to NT and the number of receiving antennas is increased to NR, channel transmission capacity is increased theoretically in proportion to the number of antennas unlike that a plurality of antennas are used in only a transmitter or a receiver. Accordingly, it is possible to improve a transmission rate and remarkably improve frequency efficiency. As channel transmission capacity is increased, a transmission rate may be increased theoretically as much as a value obtained by multiplying a maximum transmission rate R0, which corresponds to a case where a single antenna is used, by an increase rate Ri.

$$R_i = \min(N_T, N_R) \qquad \text{[Equation 1]}$$

For example, in a MIMO communication system that uses four transmitting antennas and four receiving antennas, a transmission rate theoretically four times greater than that of a single antenna system may be obtained. After theoretical capacity increase of the MIMO system has been proved in the middle of 1990, various technologies have been actively studied to substantially improve a data transmission rate. Also, some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and modeling of a MIMO system, and the study of time space signal processing technology for improvement of transmission reliability and transmission rate.

A communication method in a MIMO system will now be described in more detail with reference to mathematical modeling. As shown in FIG. 3(a), it is assumed that NT transmitting antennas and NR receiving antennas exist. First of all, a transmitting signal will be described. If there exist NT transmitting antennas, the number of maximum transmission information is NT. The transmission information may be expressed as a vector as expressed by the following Equation 2.

$$s=[s_1, s_2, \ldots, s_{N_T}]^T \quad \text{[Equation 2]}$$

Meanwhile, different kinds of transmission power may be applied to each of the transmission information $S_1, S_2, \ldots, S_{N_T}$. At this time, supposing that each transmission power is $P_1, P_2, \ldots, P_{N_T}$, transmission information of which transmission power is controlled may be expressed as a vector as expressed by the following Equation 3.

$$\hat{s}=[\hat{s}_1, \hat{s}_2, \ldots, \hat{s}_{N_T}]^T=[P_1 s_1, P_2 s_2, \ldots, P_{N_T} s_{N_T}]^T \quad \text{[Equation 3]}$$

Also, $\hat{S}$ may be expressed using a diagonal matrix P of the transmission power as expressed by the following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix W is applied to the information vector $\hat{S}$ of which transmission power is controlled, so as to obtain NT transmitting signals $x_1, x_2, \ldots, x_{N_T}$. In this case, the weight matrix W serves to properly distribute the transmission information to each antenna depending on the channel status, etc. Such transmitting signals $x_1, x_2, \ldots, x_{N_T}$ may be expressed using a vector X as expressed by the following Equation 5. In this case, In this case, Wij means a weight value between the ith transmitting antenna and the jth information. W may be referred to as a weight matrix or a precoding matrix.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

If there exist NR receiving antennas, receiving signals $y_1, y_2, \ldots, y_{N_R}$ of the respective antennas may be expressed by a vector as expressed by the following Equation 6.

$$y=[y_1, y_2, \ldots, y_{N_R}]^T \quad \text{[Equation 6]}$$

Meanwhile, in case of channel modeling in the MIMO communication system, channels may be classified depending on indexes of transmitting and receiving antenna indexes. In this case, a channel that passes from the jth transmitting antenna to the ith receiving antenna will be expressed as hij. It is noted that index of the receiving antenna is prior to index of the transmitting antenna in index of hij.

Several channels may be grouped into one and then may be expressed by a vector and matrix type. An example of the vector expression will be described as follows. FIG. 3(b) illustrates channels from NT transmitting antennas to the receiving antenna i.

As shown in FIG. 5(b), the channels from NT transmitting antennas to the ith receiving antenna may be expressed as follows.

$$h_i^T=[h_{i1}, h_{i2}, \ldots, h_{iN_T}] \quad \text{[Equation 7]}$$

Also, all channels from NT transmitting antennas to NR receiving antennas through the matrix expression of the Equation 7 may be expressed by the following Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Since additive white Gaussian noise (AWGN) is actually added to the channels after the above channel matrix H. AWGN $n_1, n_2, \ldots, n_{N_R}$ added to each of the NR receiving antennas may be expressed by the following Equation 9.

$$n=[n_1, n_2, \ldots, n_{N_R}]^T \quad \text{[Equation 9]}$$

The receiving signals obtained using the above Equations may be expressed by the following Equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the number of rows and columns of the channel matrix H indicating the channel status is determined by the number of transmitting antennas and the number of receiving antennas. The number of rows in the channel matrix H is the same as the number NR of receiving antennas, and the number of columns is the same as the number NT of transmitting antennas. In other words, the channel matrix H may be expressed by NR×NT matrix. Generally, a rank of the matrix is defined by the smaller number of the number of rows and the number of columns, which are independent from each other. Therefore, the rank of the matrix cannot have a value greater than the number of rows or the number of columns. The rank of the channel matrix H may be expressed by the following Equation 11.

$$\text{rank}(H) \leq \min(N_T, N_R) \quad \text{[Equation 11]}$$

A variety of MIMO transmission/reception (Tx/Rx) schemes, such as a frequency switched transmit diversity (FSTD) scheme, a Space Frequency Block Code (SFBC) scheme, a Space Time Block Code (STBC) scheme, a Cyclic Delay Diversity (CDD) scheme, a time switched transmit diversity (TSTD) scheme, may be used for operation of the MIMO system. In case of Rank 2 or higher, Spatial Multiplexing (SM), Generalized Cyclic Delay Diversity (GCDD), Selective Virtual Antenna Permutation (S-VAP), etc. may be used.

The FSTD scheme is to allocate subcarriers having different frequencies to signals transmitted through multiple antennas so as to obtain diversity gain. The SFBC scheme is to efficiently apply selectivity of a spatial domain and a frequency domain so as to obtain diversity gain and multiuser scheduling gain. The STBC scheme is to apply selectivity of a spatial domain and a time domain. The CDD scheme is to obtain diversity gain using path delay between the respective transmitting antennas. The TSTD scheme is to divide signals transmitted through multiple antennas depending on time. The spatial multiplexing scheme is to transmit different data through the respective antennas so as to increase a transmission rate. The GCDD scheme is to apply selectivity of a time domain and a frequency domain. The S-VAP scheme uses a single precoding matrix and includes a Multi Codeword (MCW) S-VAP for mixing multiple codewords among antennas in spatial diversity or spatial multiplexing and a Single Codeword (SCW) S-VAP using a single codeword.

In case of the STBC scheme among the aforementioned MIMO transmission schemes, the same data symbol is repeated to support orthogonality in a time domain so that time diversity may be obtained. Similarly, the SFBC scheme enables the same data symbol to be repeated to support orthogonality in a frequency domain so that frequency diversity may be obtained. An exemplary time block code used for STBC and an exemplary frequency block code used for SFBC are shown in Equation 12 and Equation 13, respectively. The Equation 12 illustrates a block code in case of 2 transmitting (Tx) antennas, and the Equation 13 illustrates a block code in case of 4 transmitting (Tx) antennas.

$$\frac{1}{\sqrt{2}}\begin{pmatrix} S_1 & S_2 \\ -S_2^* & S_1^* \end{pmatrix} \quad \text{[Equation 12]}$$

$$\frac{1}{\sqrt{2}}\begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 13]}$$

In the Equations 12 and 13, Si (i=1, 2, 3, 4) means a modulated data symbol. In addition, each row of the matrixes of the Equation 12 and 13 may indicate an antenna port, and each column may indicate time (in case of STBC) or frequency (in case of SFBC).

Codebook Based Precoding Scheme

To support MIMO transmission, precoding for appropriately distributing transmission information to antennas according to channel state can be applied. Codebook based precoding refers to a scheme in which a transmitting side and a receiving side predetermine a set of precoding matrices, the receiving side (e.g. UE) measures channel information from the transmitting side (e.g. eNB) and feeds back information on a most suitable precoding matrix (i.e. precoding matrix index (PMI)) to the transmitting side and the transmitting side applies appropriate precoding to signal transmission.

Since the codebook based precoding scheme selects an appropriate matrix from the predetermined set of precoding matrices, feedback overhead can be reduced compared to explicit feedback of optimal precoding information to actual channel information although optimal precoding is not applied all the time.

Figure 4:
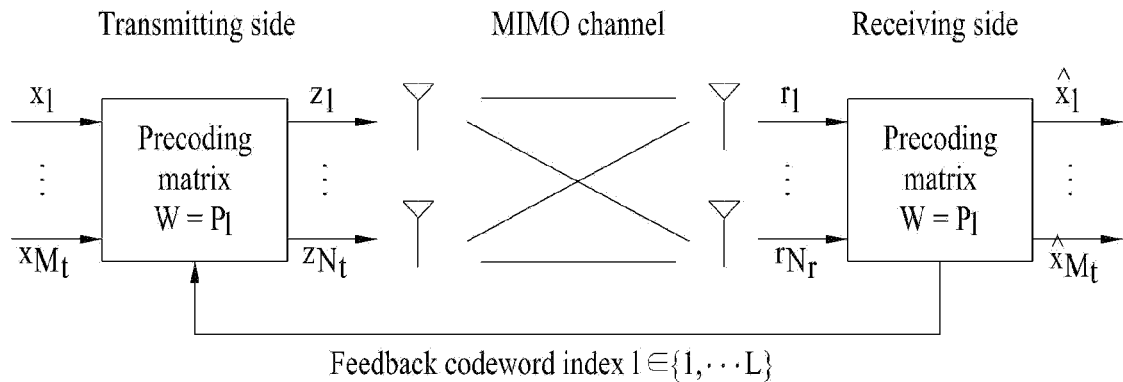
FIG. 4 illustrates the fundamental concept of codebook based precoding.

FIG. 4 illustrates the fundamental concept of codebook based precoding.

According to the codebook based precoding scheme, the transmitting side and the receiving side share codebook information including a predetermined number of precoding matrices which are predetermined based on transmission rank, number of antennas, etc. That is, when feedback information is finite, a precoding based codebook scheme can be used. The receiving side can measure channel state through a received signal and feed back a finite number of pieces of preferred precoding matrix information (i.e. indices of corresponding precoding matrices) to the transmitting side on the basis of the aforementioned codebook information. For example, the receiving side can measure a received signal using ML (Maximum Likelihood) or MMSE (Minimum Mean Square Error) and select an optimal precoding matrix. While FIG. 4 shows that the receiving side transmits precoding matrix information per codeword to the transmitting side, the present invention is not limited thereto.

Upon reception of feedback information from the receiving side, the transmitting side can select a specific precoding matrix from the codebook based on the received information. The transmitting side can perform precoding by multiplying layer signals corresponding to a transmission rank by the selected precoding matrix and transmit precoded transmission signals to the receiving side through a plurality of antennas. In a precoding matrix, the number of rows equals the number of antennas and the number of columns equals the number of layers. For example, when the number of Tx antennas is 4 and the number of transport layers is 2, a 4×2 matrix can be configured as a precoding matrix. Information transmitted through each layer can be mapped to each antenna through the precoding matrix.

Upon reception of the precoded signals transmitted from the transmitting side, the receiving side can perform inverse processing of precoding performed by the transmitting side on the received signals to recover the received signals. Since a precoding matrix satisfies unitary matrix (U) conditions such as $U*U^H=I$, inverse processing of precoding can be performed in such a manner that the received signals are multiplied by a Hermitian matrix $P^H$ of the precoding matrix P used for precoding of the transmitting side.

Table 1 shows a codebook used for downlink transmission using 2 Tx antennas in 3GPP LTE Release-8/9 and Table 2 shows a codebook used for downlink transmission using 4 Tx antennas in 3GPP LTE Release-8/9.

TABLE 1

| Codebook index | Number of layers υ | |
|---|---|---|
| | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | — |

TABLE 2

| Codebook index | $u_n$ | Number of layers $\nu$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ is obtained form a set $\{s\}$ configured from $W_n = I - 2u_n u_n^H / u_n^H u_n$. Here, I denotes a 4×4 unitary matrix and $u_n$ is a value obtained from Table 2.

As shown in Table 1, the codebook for 2 Tx antennas has a total of 7 precoding vectors/matrices. Here, since the single matrix is for an open-loop system, the number of precoding vectors/matrices for precoding of a closed-loop system becomes 6. The codebook for 4 Tx antennas, shown in Table 2, has a total or 64 precoding vectors/matrices.

The aforementioned codebook has common characteristics such as constant modulus (CM) characteristics, nested property, constrained alphabet, etc. According to CM characteristics, elements of all precoding matrices in the codebook do not include '0' and have the same size. According to the nested property, a precoding matrix of a low rank is composed of a subset of a specific column of a precoding matrix of a high rank. The constrained alphabet characteristic refers to a characteristic that alphabets of elements of all precoding matrices in the codebook are composed of $$\left\{\pm 1,\ \pm j,\ \pm \frac{(1+j)}{\sqrt{2}},\ \pm \frac{(-1+j)}{\sqrt{2}}\right\}.$$

In Table 2, $W_n^{\{s\}}$ is obtained form a set $\{s\}$ configured from $W_n = I - 2u_n u_n^H / u_n^H u_n$. Here, I denotes a 4×4 unitary matrix and $u_n$ is a value obtained from Table 2.

As shown in Table 1, the codebook for 2 Tx antennas has a total of 7 precoding vectors/matrices. Here, since the single matrix is for an open-loop system, the number of precoding vectors/matrices for precoding of a closed-loop system becomes 6. The codebook for 4 Tx antennas, shown in Table 2, has a total or 64 precoding vectors/matrices.

The aforementioned codebook has common characteristics such as constant modulus (CM) characteristics, nested property, constrained alphabet, etc. According to CM characteristics, elements of all precoding matrices in the codebook do not include '0' and have the same size. According to the nested property, a precoding matrix of a low rank is composed of a subset of a specific column of a precoding matrix of a high rank. The constrained alphabet characteristic refers to a characteristic that alphabets of elements of all precoding matrices in the codebook are composed of $$\left\{\pm 1,\ \pm j,\ \pm \frac{(1+j)}{\sqrt{2}},\ \pm \frac{(-1+j)}{\sqrt{2}}\right\}.$$

Feedback Channel Structure

In FDD (Frequency Division Duplex) systems, an eNB cannot be aware of information on a downlink channel and thus channel information fed back by a UE is used for downlink transmission. In case of 3GPP LTE Release-8/9, a UE can feed back downlink channel information through a PUCCH or a PUSCH. The UE periodically feeds back channel information in the case of PUCCH and aperiodically feeds back the channel information at the request of the eNB in the case of PUSCH. In addition, channel information on an allocated frequency band (i.e. wideband (WB)) may be fed back or channel information on a specific number of RBs (i.e. subband (SB)) may be fed back.

Extended Antenna Configuration

Figure 5:
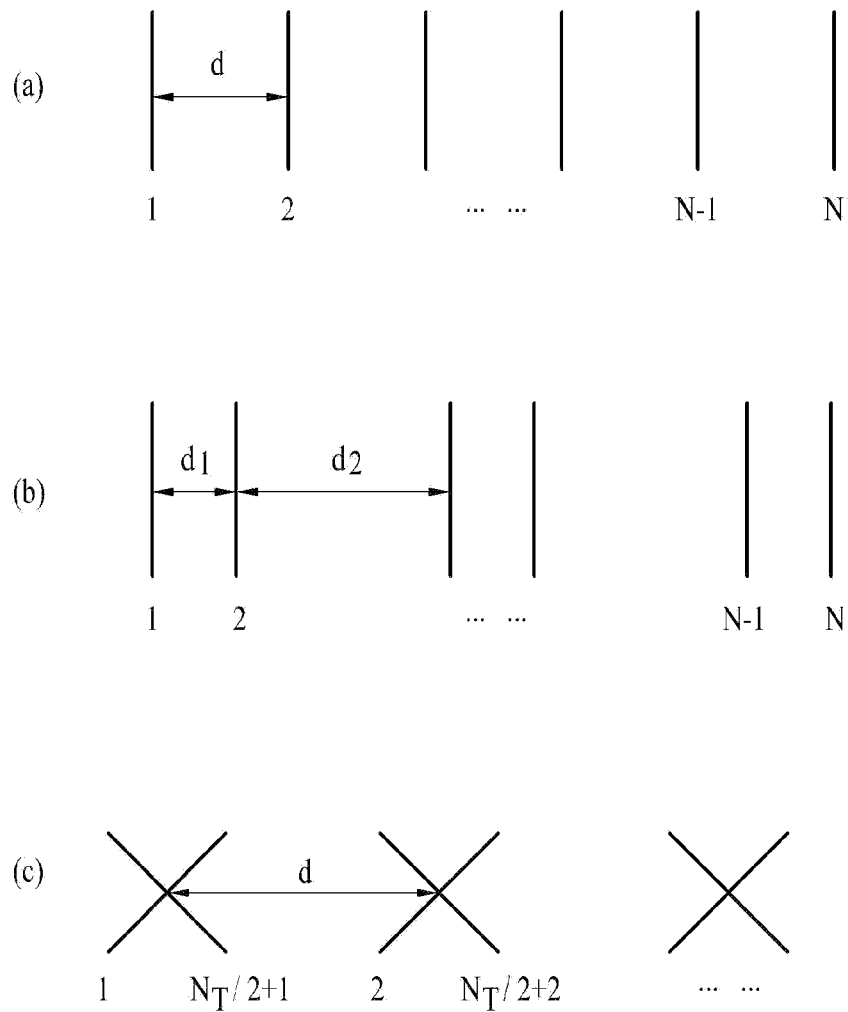
FIGS. 5(a), (b) and (c) illustrate exemplary 8-Tx antenna configurations.
Figure 6:
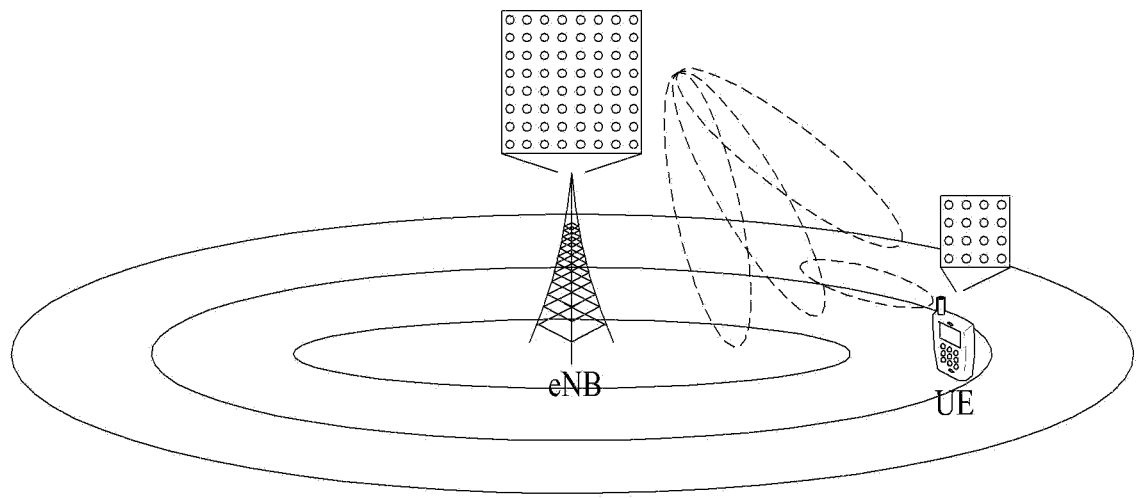
FIG. 6 illustrates an active antenna system (AAS)

FIG. 5 illustrates exemplary 8-Tx antenna configurations.

FIG. 5(a) illustrates a case in which N antennas configure independent channels without being grouped, which is referred to as a uniform linear array (ULA). In this case, a space for a transmitter and/or a receiver may be insufficient to configure independent channels by spacing out a plurality of antennas.

FIG. 5(b) illustrates a paired ULA in which antennas are paired. In this case, a related channel can be configured for paired antennas and independent channels may be configured for different antenna pairs.

3GPP LTE Release-10 may use 8 Tx antennas on downlink, distinguished from 3GPP LTE Release-8/9 using 4 Tx antennas. To apply this extended antenna configuration, ULA antenna configurations as shown in FIGS. 5(a) and 5(b) may not be suitable since a plurality of Tx antennas needs to be installed in an insufficient space. Accordingly, a dual-pole (or cross-pole) antenna configuration as shown in FIG. 5(c) can be considered. In this case, antenna correlation can be reduced to enable data transmission with high throughput even if a distance d between antennas is short.

Codebook Structure

As described above, feedback overhead when a receiving side feeds back precoding information to be used for MIMO transmission from a transmitting side can be reduced by sharing a pre-defined codebook between the transmitting and the receiving side, achieving efficient precoding.

To configure a pre-defined codebook, a precoder matrix can be configured using a DFT (Discrete Fourier Transform) matrix or Walsh matrix. Otherwise, precoders in various forms can be configured according to combination with a phase shift matrix or phase shift diversity matrix.

In the case of co-polarization antenna, DFT based codebooks provide high performance. In configuration of a DFT matrix based codebook, an n×n DFT matrix can be defined as represented by Equation 1.

$$DFTn: D_n(k, \ell) = \frac{1}{\sqrt{n}} \exp(-j2\pi k\ell/n), \quad [\text{Equation 14}]$$
$$k, \ell = 0, 1, \ldots, n-1$$

In case of DFT matrix of Equation 14, only one matrix is present for a specific size n. Accordingly, it can be considered to additionally configure and use a rotated version of the DFTn matrix in order to define various precoding matrices and appropriately use the precoding matrices according to situation. Equation 15 represents an exemplary rotated DFTn matrix.

$$\text{rotated } DFTn: D_n^{(G,g)}(k, \ell) =$$
$$\frac{1}{\sqrt{n}} \exp(-j2\pi k(\ell + g/G)/n), \quad [\text{Equation 15}]$$
$$k, \ell = 0, 1, \ldots, n-1, g = 0, 1, \ldots, G.$$

When the DFT matrix is configured as represented by Equation 2, G rotated DFTn matrices can be generated and the generated matrices satisfy characteristics of the DFT matrix.

A description will be given of a Householder-based codebook structure. The Householder-based codebook structure refers to a codebook configured in a Householder matrix. The Householder matrix is used for Householder transform which is a linear transformation and can be used to perform QR decomposition. QR decomposition refers to decomposition of a matrix into an orthogonal matrix Q and an upper triangular matrix R. The upper triangular matrix refers to a square matrix in which elements below main diagonal entries are all 0. An exemplary 4×4 Householder matrix is represented by Equation 16.

$$M_1 = I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \quad [\text{Equation 16}]$$
$$u_0^T = [1 \quad -1 \quad -1 \quad -1]$$

A 4×4 unitary matrix having CM characteristics can be generated according to Householder transform. A codebook can be configured such that an n×n precoding matrix is generated using Householder transform and a column subset of the generated precoding matrix is used as a precoding matrix for transmission at a rank less than n as the codebook for 4 Tx antennas as shown in Table 2.

Codebook for 8 Tx Antennas

In 3GPP LTE Release-10 having an extended antenna configuration (e.g. 8 Tx antennas), a feedback scheme used in 3GPP LTE Release-8/9 can be extended and applied. For example, channel state information (CIS) such as an RI (Rank Indicator), PMI (Precoding Matrix Index), CQI (Channel Quality Information), etc. can be fed back. A description will be given of a method for designing a dual precoder based feedback codebook which can be used in a system supporting an extended antenna configuration. In the dual precoder based feedback codebook, a receiving side can transmit a PMI to a transmitting side in order to indicate a precoder to be used for MIMO transmission of the transmitting side. A precoding matrix can be indicated by a combination of two different PMIs. That is, the receiving side feeds back two different PMIs (i.e. a first PMI and a second PMI) to the transmitting side and the transmitting side determines a precoding matrix indicated by a combination of the first and second PMIs and applies the precoding matrix for MIMO transmission.

In design of the dual precoder based feedback codebook, 8-Tx antenna MIMO transmission, support for single user-MIMO (SU-MIMO) and multiple user-MIMO (MU-MIMO), suitability of various antenna configurations, codebook design standards, codebook size, etc. can be considered.

A codebook applied to MIMO transmission using 8 Tx antennas can be designed such that the codebook supports only SU-MIMO in case of rank 2 or higher, is optimized for both SU-MIMO and MU-MIMO in case of rank 2 or less and is adapted to various antenna configurations.

For MU-MIMO, it is preferable to separate UEs participating in MU-MIMO in the correlation domain. Accordingly, a codebook for MU-MIMO needs to be designed to correctly operate on a channel having high correlation. Since DFT vectors provide high performance on a channel having high correlation, inclusion of a DFT vector in a set of codebooks of up to rank 2 can be considered. In addition, in a scattering propagation environment (e.g. indoor environment having lots of reflected waves) in which many spatial channels can be generated, SU-MIMO may be more suitable as a MIMO scheme. Accordingly, it can be considered that codebooks for ranks higher than rank-2 are designed such that the codebooks have high performance of separating multiple layers.

In design of a precoder for MIMO transmission, it is desirable that one precoder structure has high performance for various antenna configurations (low-correlation, high-correlation and cross-polarization antenna configurations). In arrangement of 8 Tx antennas, a cross-polarization array having an antenna spacing of 4λ may be configured as a low-correlation antenna configuration, a ULA having an antenna spacing of 0.5λ may be configured as a high-correlation antenna configuration, or a cross-polarization array having an antenna spacing of 0.5λ may be configured as a cross-polarization antenna configuration. A DFT based codebook structure can provide satisfactory performance for the high-correlation antenna configuration.

Block diagonal matrices may be more suitable for the cross-polarization antenna configuration. Accordingly, when a diagonal matrix is introduced to a codebook for 8 Tx antennas, a codebook providing high performance for all antenna configurations can be configured.

Codebook design standards need to satisfy a unitary codebook, CM characteristics, finite alphabet, appropriate codebook size, nested property, etc., as described above. The codebook design standards are applied to 3GPP LTE Release-8/9 codebook design. Application of the codebook design standards to 3GPP LTE Release-10 codebook design supporting extended antenna configurations can be considered.

To support advantages of using 8 Tx antennas in relation to codebook size, codebook size needs to increase. A large codebook (e.g. codebook of 4 bits or more for rank 1 and rank 2)

may be needed to obtain a sufficient precoding gain from 8 Tx antennas in a low-correlation environment. A 4-bit codebook may be sufficient to obtain a precoding gain in a high-correlation environment. However, the codebook size for rank 1 and rank 2 can be increased in order to accomplish multiplexing gain of MU-MIMO.

Based on the above description, the present invention provides an effective grouping and feedback method for aligning channels in the same direction when transmit diversity is used in a wireless communication system. Particularly, the present invention is effective when a transmitter uses a massive antenna employing an active antenna system (AAS) and can be used for downlink communication between an eNB and a UE in a cellular network as a representative embodiment.

FIG. 5 illustrates the AAS.

Introduction of the AAS is considered in wireless communication systems following LTE Rel-12. The AAS refers to a system composed of active antennas each of which includes an active circuit capable of controlling the phase and magnitude of a signal, distinguished from a conventional passive antenna system in which the active circuit is separated from an antenna.

Particularly, the AAS is efficient in terms of energy and operation cost since the AAS uses active antennas and thus does not require an additional cable, connector, hardware and the like to connect the active circuit to antennas. In addition, since the AAS supports electronic beam control for each antenna, the AAS enables enhanced MIMO technology such as formation of an accurate beam pattern in consideration of a beam direction and a beam width or formation of a three-dimensional beam pattern.

With the introduction of an enhanced antenna system such as the AAS, a large-scale MIMO system having a plurality of input/output antennas and a multi-dimensional antenna structure is considered. For example, when a two-dimensional antenna array instead of a conventional linear antenna array is formed, a three-dimensional beam pattern can be generated according to active antennas of the AAS.

Accordingly, when an eNB uses the three-dimensional beam pattern, the eNB can consider sector formation in the vertical direction of the beam as well as the horizontal direction. Furthermore, when a UE forms a reception beam using a large-scale reception antenna, a signal power increase according to antenna array gain can be expected and thus system performance requirements can be satisfied with lower Tx power than that required for conventional antenna systems.

Figure 7:
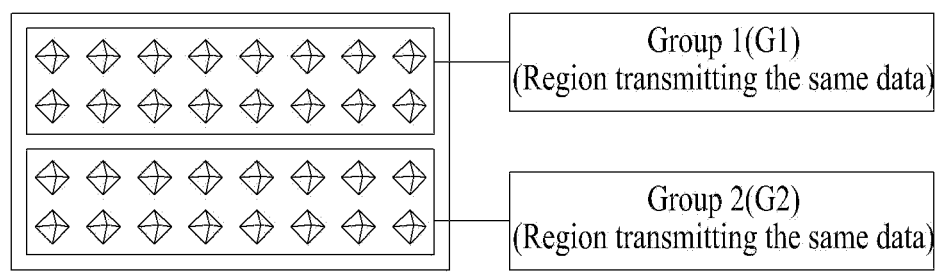
FIG. 7 is a diagram for illustrating an embodiment to which the present invention is applied.

FIG. 7 illustrates a 2D-AAS to which the present invention is applicable. The 2D-AAS is a large-scale antenna system which is constructed by arranging antennas in vertical and horizontal directions. A description will be given of a case in which a legacy 1-layer system is used when the 2D-AAS as shown in FIG. 7 is introduced.

The legacy 1-layer system is a precoding method for transmitting one piece of data per unit time and per frequency. To this end, a conventional precoding scheme designs precoding using anti-phase of a channel when a receiving side has one antenna and designs precoding using an eigenvector having a largest eigenvalue of the channel when the receiving side has multiple antennas. Both the methods need to feed back as many phases as the number of antennas or to feed back phases and power as necessary. Accordingly, feedback overhead linearly increases according to the number of antennas. For example, for a 2D-AAS having 64 antennas, 64-bit feedback overhead is needed. However, transmission of such a large amount of channel information is not efficient. Furthermore, the quantity of calculations of a PMI, CQI and RI for such CSI may cause complexity such that the receiving side cannot process the calculations within a limited time or large processing overhead.

Accordingly, to solve this problem, the present invention provides a method of grouping antennas. Specifically, when a transmitting side having 16 antennas transmits information, and 10 channels having phases in the range of 0° to 180° and 6 channels having phases in the range of 180° to 360° are present from the viewpoint of a receiving side, the receiving side will obtain a high channel gain if the receiving side groups the 10 antennas, groups the 6 antennas and respectively arranges the two antenna groups in orthogonal spaces. In this case, the Alamouti scheme can be used to arrange the antenna groups in the orthogonal spaces. In addition, the aforementioned grouping method may be changed per channel and information on the grouping method may be shared between the transmitting side and the receiving side so as to obtain channel gain.

More specifically, for efficient feedback to a transmitting side having many antennas, the present invention provides methods for efficiently grouping antennas such that channels are aligned in the same direction and feeding back information when the transmit diversity system is used. The present invention is described on the basis of two transmit diversity systems: the Alamouti scheme that orthogonalizes two pieces of data and transmits the orthogonalized data; and a quasi-orthogonal scheme that quasi-orthogonalizes four pieces of data and transmits the orthogonalized data. In the case of the quasi-orthogonal system, four pieces of data are not completely orthogonal. While description is based on the Alamouti scheme and the quasi-orthogonal scheme for convenience of description, any method of orthogonalizing and transmitting data can be applied to the present invention.

First Embodiment

A description will be given of a method for orthogonalizing two pieces of data and transmitting the orthogonalized data according to a first embodiment of the present invention.

For example, the Alamouti scheme, one of methods for orthogonalizing two pieces of data and transmitting the orthogonalized data, orthogonalizes two pieces of data and transmits the orthogonalized data over two resource elements (REs) (a transmission unit being one time unit and one frequency unit). In this case, it is assumed that the two REs are transmitted through the same channel. Here, antennas of the transmitting terminal, through which the two pieces of data are transmitted, can be grouped. For example, a transmitting terminal having 32 antennas is shown in FIG. 7. FIG. 7 shows that upper 16 antennas are used to transmit one piece of data and lower 16 antennas are used to transmit the other piece of data. If the transmitting terminal has $N_t$ antennas, then $2^{N_t}$ grouping methods can be applied. However, it is difficult to consider all the grouping methods and thus the present invention is described on the basis of two grouping methods in the specification for convenience of description.

When antenna groups that respectively transmit two pieces of data are $G_1$ and $G_2$, the antenna groups respectively have different antenna indices. For example, considering four antennas, when antennas #1, #2 and #3 form a group and antenna #4 forms the other group, $G_1=\{1,2,3\}$ and $G_2=\{4\}$.

The antenna groups can be allocated to two REs. That is, data in a data vector $$\frac{1}{\sqrt{N_t}}[x_1 \quad x_2]^T$$

is used per antenna group in the first RE. Here, $$\frac{1}{\sqrt{N_t}}$$

is a normalization value.

$$\frac{1}{\sqrt{N_t}}x_1$$

is transmitted through antennas belonging to $G_1$ and $$\frac{1}{\sqrt{N_t}}x_2$$

is transmitted through antennas belonging to $G_2$. Similarly, data in a data vector $$\frac{1}{\sqrt{N_t}}[-x_2^* \quad x_1^*]^T$$

is used per antenna group in the second RE.

$$-\frac{1}{\sqrt{N_t}}x_2^*$$

is transmitted through the antennas belonging to $G_1$ and $$\frac{1}{\sqrt{N_t}}x_1^*$$

is transmitted through the antennas belonging to $G_2$. When the same channel is assumed for the two REs, $x_1$ and $x_2$ obtain a channel gain as represented by expression 17.

$$\frac{1}{N_t} \times \left(\sum_{i \in G_1} H_i\right)^2 + \frac{1}{N_t} \times \left(\sum_{k \in G_2} H_k\right)^2 \quad \text{[Expression 17]}$$

In expression 17, $H_i$ represents a channel from an i-th antenna of the transmitting side to the receiving side. The first term $$\left(\text{i.e. } \frac{1}{N_t} \times \left(\sum_{i \in G_1} H_i\right)^2\right)$$

of expression 17 corresponds to a value obtained by squaring the sum of channel gains in the group $G_1$ and the second term $$\left(\text{i.e. } \frac{1}{N_t} \times \left(\sum_{k \in G_2} H_k\right)^2\right)$$

corresponds to a value obtained by squaring the sum of channel gains in the group $G_2$. That is, attainable gain depends on a grouping method, as represented by expression 17. If all channels are aligned in the same direction, all antennas may be configured such that all antennas are included in one group. In this extreme case, antenna configuration corresponds to the aforementioned optimized precoding designed for one layer and the best gain can be obtained using the antenna configuration. However, lots of feedbacks may be needed in this extreme case. The present invention can solve this problem using grouping.

A description will be given of a case in which feedback information other than information on grouping for channel alignment is not received and a case in which new feedback information (e.g. phase information) is received in addition to the information on grouping for channel alignment.

When feedback information other than information on grouping for channel alignment is not received, the channel gain represented by expression 17 can be obtained. Transmission signals can be represented by expression 18 according to grouping.

$$[y(i) \quad y(i+1)] = \begin{bmatrix} z_1 \\ z_2 \\ \vdots \\ z_{N_t} \end{bmatrix} \times \frac{1}{\sqrt{N_t}} \times \begin{bmatrix} x_1 & -x_2^* \\ x_2 & x_1^* \end{bmatrix} \quad \text{[Expression 18]}$$

In expression 18, i and i+1 indicate that signals are transmitted through different REs. Here, in the vector $Z=[z_1 \, z_2 \ldots z_{N_t}]^t$, $z_k$ corresponds to one of $[1 \, 0]^T$ and $[0 \, 1]^T$. That is, $z_k=[1 \, 0]^T$ when k belongs to $G_1$ and $z_k=[0 \, 1]^T$ when k belongs to $G_2$. Accordingly, the Z vector varies according to grouping.

In the first grouping method, it is assumed that antennas are grouped into two groups $G_1$ and $G_2$ for the Alamouti scheme. In addition, it is assumed that the groups have the same number of antennas. Antennas are divided into $N_g$ (a multiple of 2) sub-groups $g_i$. It is assumed that the sub-groups have indices of antennas belonging thereto and include the same number of antennas. For example, 8 antennas can be represented as $g_1=\{1,2\}$, $g_2=\{3,4\}$, $g_3=\{5,6\}$, and $g_4=\{7,8\}$. Information on the sub-groups may be predetermined between the transmitting side and the receiving side or signaled through higher layer signaling (e.g. RRC signaling).

In the first grouping method, the receiving side selects the same number of sub-groups, which maximize the channel gain according to expression 17, from the sub-groups for each of $G_1$ and $G_2$. The receiving side may select the same number of sub-groups that maximize an SINR or sum-rate. For example, when 8 antennas are divided into sub-groups $g_1=\{1, 2\}$, $g_2=\{3,4\}$, $g_3=\{5,6\}$ and $g_4=\{7,8\}$, as described above, and two sub-groups are selected for each of $G_1$ and $G_2$, the sub-groups can be divided and selected to form $G_1$ and $G_2$ to maximize the channel gain according to expression 17 (or to maximize the SINR or sum-rate). Here, sub-groups for each group $G_i$ can be selected such that channel gain increases when channels are summed.

According to the aforementioned grouping method, the receiving side can feed back the Z vector information of expression 18 to the transmitting side and the transmitting side can use the Alamouti scheme for orthogonalizing data of the two groups on the basis of the feedback information. The Z vector is selected from a codebook $\omega \ni Z$. In this case, $\omega$ has (4 combination 2)/2=3 codewords z. The size of the codebook $\omega$ is normalized as $$\left(N_g \text{ combination } \frac{N_g}{2}\right)/2.$$

Here, the same codebook size is used in the same grouping method even when the configuration of the groups $G_i$ is changed. For example, a scheme of grouping sub-groups such that $G_1$ is composed of $g_1$ and $g_2$ and $G_2$ is composed of $g_3$ and $g_4$ and a scheme of grouping sub-groups such that $G_1$ is composed of $g_3$ and $g_4$ and $G_2$ is composed of $g_1$ and $g_2$ can be considered to be the same grouping scheme because the two terms of expression 17 indicate the same values even when the two terms are changed.

In addition, when the number of aligned channels is small in the aforementioned first grouping method, the receiving side may be configured such that the receiving side does not use all antenna sub-groups. For example, when 8 antennas are grouped into sub-groups $g_1=\{1,2\}$, $g_2=\{3,4\}$, $g_3=\{5,6\}$ and $g_4=\{7,8\}$, $G_1$ and $G_2$ may be composed of only one sub-group (i.e. $G_1$ and $G_2$ are respectively composed of $g_1$ and $g_2$). Even in this case, $G_1$ and $G_2$ are composed of the same number of sub-groups. The receiving side feeds back the Z vector information to the transmitting side and the transmitting side may use the Alamouti scheme on the basis of the feedback information. In this case, the codebook $\omega$ has (4 combination 2)/2+(4 combination 1)×(3 combination 1)/2=9 codewords Z. The size of the codebook $\omega$ is normalized as $\Sigma_{i=1}^{N_g/2}$ ($N_g$ combination i)×($N_g$−i combination i)/2. Here, $N_t$ for normalization in expressions 17 and 18 may be changed to the number of selected antennas.

The second grouping method selects different numbers of sub-groups for the antenna groups $G_i$. Here, selected sub-groups may be predetermined according to the number of sub-groups belonging to $G_i$. In other words, as many sub-groups as the number predetermined for $G_1$ are assigned to $G_i$ according to the order of sub-groups. For example, when 8 antennas are divided into sub-groups $g_1=\{1,2\}$, $g_2=\{3,4\}$, $g_3=\{5,6\}$ and $g_4=\{7,8\}$ and the receiving side assumes the numbers of sub-groups of $G_1$ and $G_2$ to be $\{3,1\}$, it is determined that $g_1$, $g_2$ and $g_3$ are selected for $G_1$ and $g_4$ is selected for $G_2$. Here, the receiving side can feed back the Z vector information according to the selected $G_1$ and $G_2$ and the transmitting side can use the Alamouti scheme on the basis of the feedback information. In this case, the codebook $\omega$ has 3 codewords. That is, the size of the codebook w is normalized as $N_g-1$.

In addition, when the number of aligned channels is small in the aforementioned second grouping method, the receiving side may be configured such that the receiving side does not use all antenna sub-groups. For example, when 8 antennas are divided into sub-groups $g_1=\{1,2\}$, $g_2=\{3,4\}$, $g_3=\{5,6\}$ and $g_4=\{7,8\}$, the receiving side may notify the transmitting side that $G_1$ and $G_2$ are respectively composed of two sub-groups and one sub-group. In this case, the transmitting side can determine that $g_1$ and $g_2$ are selected for $G_1$ and $g_3$ is selected for $G_2$. Accordingly, the receiving side feeds back the Z vector information to the transmitting side and the transmitting side can use the Alamouti scheme on the basis of the feedback information. In this case, the codebook $\omega$ has 3+2+1=6 codewords Z. The size of the codebook $\omega$ is normalized as $\Sigma_{i=1}^{N_g-1} i$. Here, $N_t$ for normalization in expressions 17 and 18 may be changed to the number of selected antennas.

Furthermore, the order of sub-groups may be important in the second grouping method since the transmitting side determines grouping in the order of sub-groups. Accordingly, the present invention preferably designates the order of sub-groups such that sub-groups have channel correlation in descending order. For example, the first sub-group can be arbitrarily designated, a sub-group having a highest channel correlation with the first sub-group, from among the remaining sub-groups, can be designated as the second sub-group, and a sub-group having a highest channel correlation with the second sub-group, from among the remaining sub-groups, can be designated as the third sub-group. The order of sub-groups can be set by repeating this procedure until all sub-groups are designated. Further, the order of sub-groups designated in the aforementioned manner may be predetermined between the transmitting side and the receiving side.

A description will be given of an embodiment to which the present invention is applied when the transmitting side receives feedback information for channel alignment in addition to information on grouping. For channel alignment, grouping information and precoding information with respect to antennas can be used together. Transmission signals can be represented by expression 19 according to grouping method.

$$[y(i)\quad y(i+1)] = \text{diag}[\, e^{j\theta_1}\ e^{j\theta_2}\ \ldots\ e^{j\theta_{N_t}}\,] \times \begin{bmatrix} z_1 \\ z_2 \\ \vdots \\ z_{N_t} \end{bmatrix} \times$$

$$\frac{1}{\sqrt{N_t}} \times \begin{bmatrix} x_1 & -x_2^* \\ x_2 & x_1^* \end{bmatrix}$$

[Expression 19]

In expression 19, $\theta_i$ denotes a phase that rotates $H_i$. $\theta_i$ may have the same value for antennas per sub-group or for some sub-groups. Information on sub-groups having the same value $\theta_i$ may be predetermined between the transmitting side and the receiving side or signaled through higher layer signaling (e.g. RRC signaling). When the number of sub-groups for which $\theta_i$ has the same value is $N_\phi$, $\phi_m$ can be set as $\phi_m=\{g_{N_\phi(m-1)+1}, \ldots, g_{N_\phi m}\}$. Here, $\theta_i$ can be limited under the condition of $\theta_i=\theta_k$ for $\{i,k\}\in\phi_m$ for specific m. For example, when $N_\phi=2$, the number of sub-groups having the same value of $\theta_i$ is limited to 2 in the order of sub-groups. In this case, the order or sub-groups, used in the aforementioned second grouping method, may be applied as the order of sub-groups.

In addition, when the number of antennas in a sub-group is $N_Z$, the number of different values of $\theta_i$ can be represented by $$\frac{N_t}{N_\varphi \times N_Z}.$$

That is, when a representative value of $\theta_i$ having the same value is represented by $\hat{\theta}_k$, the receiving side can feed back the value $$\left\{\hat{\theta}_1, \hat{\theta}_2, \ldots, \hat{\theta}_{\frac{N_t}{N_\varphi \times N_Z}}\right\}$$

to the transmitting side. Further, the codebook may be restricted such as $\hat{\theta}_k$ is quantized in the range of 0° to 180° or 0° to 90° on the assumption that channels are well aligned. This codebook design reduces feedback overhead.

In addition, when grouping and precoding for antennas are used together, one of the aforementioned two grouping methods can be applied on the assumption that precoding is not performed first. Thereafter, phase can be corrected by $\theta_i$ per sub-group or for some sub-groups in each group. The receiving side can feed back $$\left\{\hat{\theta}_1, \hat{\theta}_2, \ldots, \hat{\theta}_{\frac{N_t}{N_\varphi \times N_z}}\right\}$$

along with the Z vector.

For the present invention, the transmitting side can transmit a reference signal (e.g. CSI-RS in LTE) per antenna or through a port per sub-group, and the receiving side can measure a channel per antenna or per sub-group antenna. Then, the receiving side can signal the Z vector or the Z vector and $$\left\{\hat{\theta}_1, \hat{\theta}_2, \ldots, \hat{\theta}_{\frac{N_t}{N_\varphi \times N_z}}\right\}$$

to the transmitting side. Accordingly, the transmitting side can transmit, to the receiving side, a new reference signal (e.g. DM-RS in LTE) considering the Z vector and $$\left\{\hat{\theta}_1, \hat{\theta}_2, \ldots, \hat{\theta}_{\frac{N_t}{N_\varphi \times N_z}}\right\}$$

when sending data. Here, the receiving side considers corresponding channels as channels with respect to only two antenna ports according to the reference signal. The Z vector and $$\left\{\hat{\theta}_1, \hat{\theta}_2, \ldots, \hat{\theta}_{\frac{N_t}{N_\varphi \times N_z}}\right\}$$

may be fed back on the basis of RE, RBs or system bandwidth.

Second Embodiment

A description will be given of a method for orthogonalizing four pieces of data and transmitting the orthogonalized data according to a second embodiment of the present invention. The same description as the first embodiment is omitted in the following.

For convenience of description, the method for orthogonalizing four pieces of data and transmitting the orthogonalized data is described on the basis of a case in which the quasi-orthogonal transmit diversity system is used. The quasi-orthogonal transmit diversity system quasi-orthogonalizes four pieces of data, assigns the orthogonalized data to four REs and transmits the data (per unit time and per frequency). In this case, it is assumed that the four REs are transmitted on the same channel. Here, antennas of the transmitting side to transmit the four pieces of data can be grouped.

That is, when feedback information other than grouping information for channel alignment is not received, transmission signals can be represented by expression 20.

$$[y(i)\ y(i+1)\ y(i+2)\ y(i+3)] = \begin{bmatrix} z_1 \\ z_2 \\ \vdots \\ z_{N_t} \end{bmatrix} \times \frac{1}{\sqrt{N_t}} \times \begin{bmatrix} x_1 & -x_2^* & -x_3^* & x_4 \\ x_2 & x_1^* & -x_4^* & -x_3 \\ x_3 & -x_4^* & x_1^* & -x_2 \\ x_4 & x_3^* & x_2^* & x_1 \end{bmatrix} \quad \text{[Expression 20]}$$

In expression 20, i, i+1, i+2 and i+3 respectively denote different REs. Here, if $z_k$ corresponds to $[1\ 0\ 0\ 0]^T$, $[0\ 1\ 0\ 0]^T$, $[0\ 0\ 1\ 0]^T$ or $[0\ 0\ 0\ 1]^T$ in $Z=[z_1\ z_2\ \ldots\ z_{N_t}]^T$, $Z_k=[1\ 0\ 0\ 0]^T$ when k belongs to $G_1$, $z_k=[0\ 1\ 0\ 0]^T$ when k belongs to $G_2$, $z_k=[0\ 0\ 1\ 0]^T$ when k belongs to $G_3$ and $z_k=[0\ 0\ 0\ 1]^T$ when k belongs to $G_4$. Accordingly, the Z vector varies according to grouping.

Application of grouping methods will now be described in more detail as in the first embodiment.

In the first grouping method, it can be assumed that antennas are divided into four groups for the quasi-orthogonal system and the groups have the same number of antennas. That is, when antenna groups that respectively transmit the four pieces of data are $G_1$, $G_2$, $G_3$ and $G_4$, it can be assumed that the groups have different antenna indices. In addition, it can be assumed that the antennas are divided into a predetermined number (a multiple of 4) of sub-groups $g_i$. Here, it is assumed that the sub-groups $g_i$ have indices of antennas belonging thereto and the sub-groups have the same number of antennas.

In the first grouping method, the receiving side can select the same number of sub-groups, which maximize an SINR or sum-rate, for $G_i$. According to this grouping method, the receiving side can feed back the Z vector information of expression 20 to the transmitting side and the transmitting side can use the quasi-orthogonal system on the basis of the feedback information. Here, the Z vector is selected from the codebook $\omega \ni Z$ and the codebook $\omega$ has $$\Pi_{i=1}^{4}\left(N_g - \frac{N_g}{4} \times (i-1)\ \text{combination}\ \frac{N_g}{4}\right)/24\ \text{codewords}\ Z.$$

Here, it is important that the same codebook size is used in the same grouping method even when the configuration of the groups $G_i$ is changed. Although system performance is changed when the group configuration is changed in the quasi-orthogonal scheme, differently from the Alamouti scheme, the present invention ignores this part.

In addition, when the number of aligned channels is small in the aforementioned grouping method, the receiving side may be configured such that the receiving side does not use all antenna sub-groups. In this case, respective groups (i.e. $G_i$) are composed of the same number of sub-groups. Description thereof is the same as that of the first embodiment employing the Alamouti scheme and thus is replaced by the aforementioned description. In this case, the receiving side can feed back the Z vector information to the transmitting side and the transmitting side can use the quasi-orthogonal system on the basis of the feedback information. Here, when the size of the codebook $\omega$ is normalized, the codebook can have $$\Pi_{i=1}^{4}\left(N_g - \frac{N_g}{4} \times (i-1)\ \text{combination}\ k\right)/24\ \text{codewords}\ Z.$$

Here, $N_t$ for normalization in expression 20 may be changed to the number of selected antennas.

A description will be given of the second grouping method that selects different numbers of sub-groups for groups $G_i$. Here, selected sub-groups may be predetermined according to the number of sub-groups belonging to $G_i$. That is, as many sub-groups as the number predetermined for $G_1$ are assigned to $G_i$ according to the order of sub-groups, as in the first embodiment. Description thereof is the same as that of the first embodiment employing the Alamouti scheme and thus is replaced by the aforementioned description. In this case, the receiving side can feed back the Z vector information according to selected $G_i$ and the transmitting side can use the quasi-orthogonal system on the basis of the feedback information. The codebook ω has ($N_g$−i combination 3) codewords Z.

Similarly, the receiving side may be configured such that the receiving side does not use all antenna sub-groups when the number of aligned channels is small in the second grouping method. Description thereof is the same as that of the first embodiment employing the Alamouti scheme and thus is replaced by the aforementioned description. In this case, the receiving side can feed back the Z vector information according to selected $G_i$ and the transmitting side can use the quasi-orthogonal system on the basis of the feedback information. In this case, the codebook ω has $\Sigma_{i=3}^{N_g-1}$(i combination 3) codewords Z. Here, $N_1$ for normalization in expression 20 may be changed to the number of selected antennas.

Furthermore, the order of sub-groups may be important in the second grouping method since the transmitting side determines grouping in the order of sub-groups. The present invention preferably designates the order of sub-groups such that sub-groups have channel correlation in descending order. Description thereof is the same as that of the first embodiment of the present invention and thus is replaced by the aforementioned description.

When the transmitting side receives feedback information for channel alignment in addition to grouping information, grouping based on the quasi-orthogonal system may be applied. To this end, the grouping information and precoding information with respect to antennas can be used together for channel alignment. Transmission signals can be represented by expression 21 according to grouping method.

$$[y(i) \; y(i+1) \; y(i+2) \; y(i+3)] = \text{diag}[e^{j\theta_1} \; e^{j\theta_2} \; \ldots \; e^{j\theta_{N_t}}] \times \begin{bmatrix} z_1 \\ z_2 \\ \vdots \\ z_{N_t} \end{bmatrix} \times \frac{1}{\sqrt{N_t}} \times \begin{bmatrix} x_1 & -x_2^* & -x_3^* & x_4 \\ x_2 & x_1^* & -x_4^* & -x_3 \\ x_3 & -x_4^* & x_1^* & -x_2 \\ x_4 & x_3^* & x_2^* & x_1 \end{bmatrix}$$

[Expression 21]

In expression 21, $\theta_i$ denotes a phase that rotates $H_i$. $\theta_i$ may have the same value for antennas per sub-group or for some sub-groups. Information on sub-groups having the same value $\theta_i$ may be predetermined between the transmitting side and the receiving side or signaled through higher layer signaling (e.g. RRC signaling). Here, $\theta_i$ can be limited under the condition of $\theta_i=\theta_k$ for $\{i, k\}\in \phi_m$ for specific m. For example, when $N_\phi=2$, the number of sub-groups having the same value of $\theta_i$ is limited to 2 in the order of sub-groups. In this case, the order or sub-groups, used in the aforementioned second grouping method, may be applied as the order of sub-groups.

In addition, when the number of antennas in a sub-group is $N_z$, the number of different values of $\theta_i$ can be represented by $$\frac{N_t}{N_\varphi \times N_z}.$$

That is, when a representative value of $\theta_i$ having the same value is represented by $\hat{\theta}_k$, the receiving side can feed back the value $$\left\{ \hat{\theta}_1, \hat{\theta}_2, \ldots, \hat{\theta}_{\frac{N_t}{N_\varphi \times N_z}} \right\}$$

to the transmitting side. Further, the codebook may be restricted such as $\hat{\theta}_k$ is quantized in the range of 0° to 180° or 0° to 90° on the assumption that channels are well aligned. This codebook design reduces feedback overhead.

In addition, when grouping and precoding for antennas are used together, one of the aforementioned two grouping methods can be applied on the assumption that precoding is not performed first. Thereafter, phase can be corrected by $\theta_i$ per sub-group or for some sub-groups in each group. The receiving side can feed back $$\left\{ \hat{\theta}_1, \hat{\theta}_2, \ldots, \hat{\theta}_{\frac{N_t}{N_\varphi \times N_z}} \right\}$$

along with the Z vector.

For the present invention, the transmitting side can transmit a reference signal (e.g. CSI-RS in LTE) per antenna or through a port per sub-group, and the receiving side can measure a channel per antenna or per sub-group antenna. Then, the receiving side can signal the Z vector or the Z vector and $$\left\{ \hat{\theta}_1, \hat{\theta}_2, \ldots, \hat{\theta}_{\frac{N_t}{N_\varphi \times N_z}} \right\}$$

to the transmitting side. Accordingly, the transmitting side can transmit, to the receiving side, a new reference signal (e.g. DM-RS in LTE) considering the Z vector and $$\left\{ \hat{\theta}_1, \hat{\theta}_2, \ldots, \hat{\theta}_{\frac{N_t}{N_\varphi \times N_z}} \right\}$$

when sending data. Here, the receiving side considers corresponding channels as channels with respect to only two antenna ports according to the reference signal. The Z vector and $$\left\{ \hat{\theta}_1, \hat{\theta}_2, \ldots, \hat{\theta}_{\frac{N_t}{N_\varphi \times N_z}} \right\}$$

may be fed back on the basis of RE, RBs or system bandwidth.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms, fixed station, Node B, eNode B (eNB), access point, etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

INDUSTRIAL APPLICABILITY

While the feedback transmission method efficient in a multi-antenna wireless communication system and an apapratus therefor are applied to 3GPP LTE in the aforementioned embodiments, the method and apparatus can be applied to various wireless communication systems other than 3GPP LTE.

The invention claimed is:

1. A method for transmitting a signal by a base station in a wireless communication system supporting a two-dimensional active antenna, comprising:
receiving, from a user equipment, feedback information for transmitting the signal;
configuring, by the base station, a precoding matrix W as a result of a product of two precoding matrices $W_1$ and $W_2$,
wherein $W_1$ is set to maximize a sum of channel gains corresponding to a plurality of antenna groups configured according to the feedback information, and
wherein $W_2$ is configured such that signals corresponding to the plurality of antenna groups are transmitted in a mutually orthogonal manner; and
transmitting, by the base station, the signal to which the precoding matrix W has been applied on the basis of the feedback information,
wherein each of the plurality of antenna groups respectively includes a different number of antennas and has different antenna indices, and
wherein the plurality of antenna groups are configured on the basis of channel correlation thereof.

2. The method according to claim 1, wherein the sum of the channel gains is determined by expression A:

$$\frac{1}{N_t} \times \left( \sum_{i \in G_1} H_i \right)^2 + \frac{1}{N_t} \times \left( \sum_{k \in G_2} H_k \right)^2 \quad \text{[Expression A]}$$

wherein $N_t$ denotes the number of antennas of the transmitting sidetransmitting side, $H_i$ denotes a channel from an i-th antenna of the transmitting sidetransmitting side to the receiving sidereceiving side, $H_k$ denotes represents a channel from a k-th antenna of the transmitting sidetransmitting side to the receiving sidereceiving side, $G_1$ represents a first antenna group and $G_2$ represents a second antenna group (i and k being positive integers).

3. The method according to claim 1, wherein the plurality of antenna groups includes the same number of antennas and has different antenna indices.

4. The method according to claim 3, wherein the sum of the numbers of antennas included in the plurality of antenna groups is less than the number of antennas of the base station.

5. The method according to claim 1, wherein the precoding matrix W is represented as a product of three precoding matrices $W_1$, $W_2$ and $W_3$, and $W_3$ is configured as a diagonal matrix indicating phase coefficients.

6. The method according to claim 5, wherein $W_3$ is configured to be quantized within a predetermined range.

7. The method according to claim 1, wherein $W_2$ is configured such that Alamouti scheme is applied.

8. The method according to claim 1, wherein $W_2$ is configured such that a quasi-orthogonal scheme is applied.

9. The method according to claim 1, further comprising signaling information on the plurality of antenna groups to the user equipment using higher layer signaling.

10. The method according to claim 1, wherein the feedback information is information on a channel state measured on the basis of a reference signal transmitted from the base station to the user equipment.

11. The method according to claim 1, wherein the feedback information is set on the basis of at least one of a resource element (RE), a resource block (RB) and a system bandwidth.

* * * * *